UNITED STATES PATENT OFFICE.

HEINRICH BRONIATOWSKI, OF BASEL, SWITZERLAND, ASSIGNOR TO SOCIETY OF CHEMICAL INDUSTRY IN BASLE, OF BASEL, SWITZERLAND.

GRAY VAT DYES AND PROCESS OF MAKING.

968,533.　　Specification of Letters Patent.　Patented Aug. 30, 1910.

No Drawing.　　Application filed April 4, 1910.　Serial No. 553,244.

*To all whom it may concern:*

Be it known that I, HEINRICH BRONIATOWSKI, doctor of philosophy and chemist, a subject of the Emperor of Russia, and resident of Basel, Switzerland, have invented new and useful Gray Vat Dyestuffs and a Process of Making Same, of which the following is a full, clear, and exact specification.

I have found, that valuable gray vat-dyestuffs are obtained, by treating amidonaphthanthraquinone with condensing agents, as for instance antimony pentachlorid and by subjecting the resulting product of condensation to the action of halogens. The amidonaphthanthraquinone used as parent material, which has hitherto nowhere been described, may be prepared by condensing alpha-chloronaphthalene with phthalic anhydrid, transforming the resulting chloronaphthoylbenzoic acid into chloronaphthanthraquinone and substituting in this latter a group "amido" for the chlorin atom by heating the same with alcoholic ammonia under pressure.

The process is illustrated by the following examples.

Example I: 10 parts of amidonaphthanthraquinone are boiled with 10 parts of antimony pentachlorid and 100 parts of nitrobenzene for an hour in a recipient provided with a reflux cooler. The coloring matter separated in form of small crystals of coppery reflex is isolated by filtration and washed with alcohol. It dissolves in hot nitrobenzene with a green-blue coloration and in concentrated sulfuric acid with an olive-brown coloration. By treating the coloring matter with sodium hydrosulfite and soda lye it yields a blue vat dyeing cotton beautiful bluish gray tints.

Example II: 10 parts of the coloring matter obtained according to Example I are heated to ebullition with 100 parts nitrobenzene and 10-15 parts bromin, while stirring, for 4 hours, in a recipient provided with a reflux cooler. After cooling of the reaction mass, the separated dyestuff is isolated by filtration, washed with alcohol and dried. It constitutes a bluish black powder dissolving in hot nitrobenzene to a violet-blue solution and in concentrated sulfuric acid to a brown solution. With alkali and hydrosulfite it yields a blue vat dyeing cotton intense bluish gray tints of excellent fastness to washing, light and chlorin.

Example III: 10 parts of the coloring matter prepared according to Example 1 are dissolved in 200 parts of sulfuric acid of 66° Baumé specific gravity and 8 to 10 parts bromin are allowed to flow slowly into the solution thus obtained, at a temperature of 60 to 100° C. and while stirring. In order to finish the reaction, the mixture is further heated for several hours at the specified temperature. After cooling the mass is poured into ice water, the dyestuff separated is isolated by filtration and washed with water. The bluish gray paste thus obtained can be employed directly for dyeing. The dyeings obtained on cotton show a little more greenish tints than those obtained with the dyestuff of Example II.

The brominating can also be executed without employment of a diluent or a solvent by direct action of liquid bromin on the coloring matter. The action of bromin can also be aided by addition of a halogen carrier. It is also possible to prepare the chlorin derivatives of the coloring matter obtained according to Example 1, the said chlorin derivatives being similar to the described bromin derivatives.

What I claim is:

1. The described process for the manufacture of gray vat-dyestuffs which consists in treating amidonaphthanthraquinone with condensing agents and in subjecting the thus obtained coloring matter to the action of halogenating agents.

2. The described process for the manufacture of gray vat-dyestuffs, which consists in treating amidonaphthanthraquinone with antimony pentachlorid and in subjecting the resulting coloring-matter to the action of halogenating agents.

3. The described process for the manufacture of gray vat-dyestuffs which consists in treating amidonaphthanthraquinone with a condensing agent and in subjecting the resulting coloring-matter to the action of brominating agents.

4. The described process for the manufacture of gray vat-dyestuffs, which consists in treating amidonaphthanthraquinone with antimony pentachlorid and in subjecting the resulting coloring-matter to the action of bromin.

5. As new products the described halogenated gray vat-dyestuffs derived from amidonaphthanthraquinone, forming in dry state black powders soluble in hot nitrobenzene with a violet-blue to blue color and in concentrated sulfuric acid with a brown color and yielding with caustic alkali and hydrosulfite a blue vat dyeing cotton bluish gray tints fast to washing, light and chlorin.

In witness whereof I have hereunto signed my name this 24th day of March 1910, in the presence of two subscribing witnesses.

HEINRICH BRONIATOWSKI.

Witnesses:
GEO. GIFFORD,
AMAND RITTER.